Jan. 26, 1932.    B. BOGOSLOWSKY    1,842,776
FLUID STRUT
Filed March 15, 1930
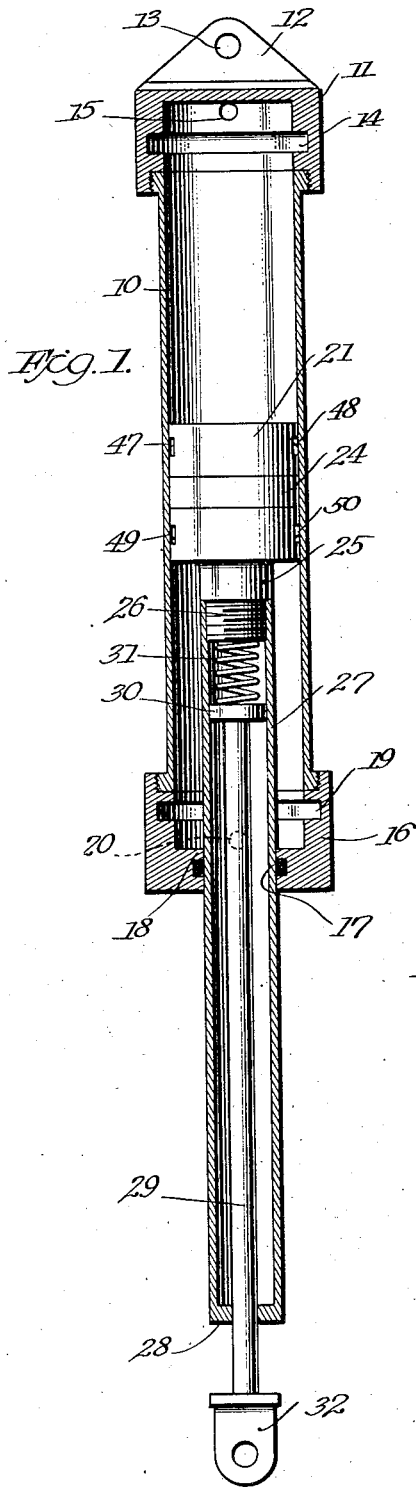
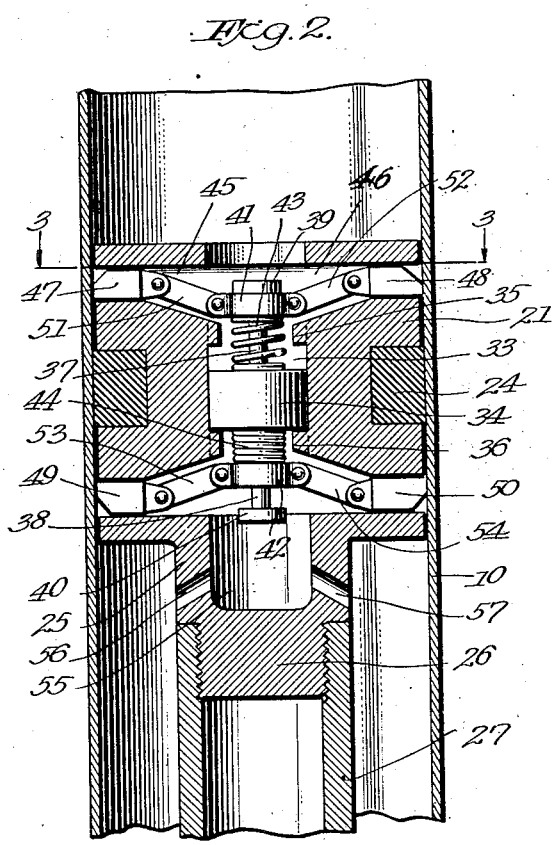
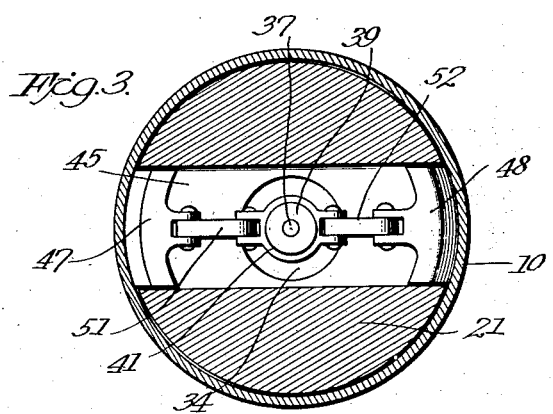
Boris Bogoslowsky
INVENTOR
BY
ATTORNEY Patented Jan. 26, 1932

1,842,776

UNITED STATES PATENT OFFICE

BORIS BOGOSLOWSKY, OF STRATFORD, CONNECTICUT, ASSIGNOR TO SIKORSKY AVIATION CORPORATION, OF WILMINGTON, DELAWARE, A CORPORATION OF DELAWARE

FLUID STRUT

Application filed March 15, 1930. Serial No. 436,113.

The present invention relates generally to automatically releasable means for automatically locking cooperating cylinder and piston elements against relative movement at any desired point of their permissible relative movement. While I shall describe the invention as applied to telescoping elements, such as are used to project and retract the landing wheels of amphibians, it will be understood that this embodiment of the invention is merely illustrative and in no sense restrictive. As applied to such telescoping members, the present invention is preferably so adapted as to lock the members together at each limit of their relative movement.

In the accompanying drawings,

Figure 1 is a longitudinal section, with parts in elevation, of a telescopic wheel controlling member of an amphibian.

Figure 2 is an enlarged section of a portion of the device of Figure 1, and

Figure 3 is a section on line 3—3 of Figure 2.

Referring to the drawings, reference numeral 10 designates a cylinder closed at its upper end by means of a cap 11 threaded thereto, the cap being provided with an external diametrical flange 12 provided with an aperture 13 by means of which the upper end of the device is operatively connected with appropriate mounting means provided on the amphibian. The interior of the cap is provided with an annular groove 14, and above this groove is an aperture 15 through which fluid under pressure is adapted to be supplied, and the pressure fluid utilized may be either hydraulic or pneumatic.

The lower end of cylinder 10 has threaded thereto a cap 16 provided with a central bore 17, in the walls of which is an annular groove containing a compressible packing 18. Cap 16 is further provided with an internal annular groove 19, and with an inlet 20 for the pressure fluid.

Within cylinder 10 is reciprocable a piston 21 provided with a central leather or similar packing ring 24. At its lower end piston 21 has integral therewith a coaxial boss 25 having a reduced threaded extremity 26 with which is engaged the interiorly threaded end of an elongated tubular member 27 which passes through aperture 17 of cap 16. The lower closed end 28 of member 27 is provided with an axial aperture through which is passed a rod headed at its upper end at 30 to provide a seat for a compression spring 31 which is interposed between it and the lower face of boss 25. At its lower end rod 29 is provided with an eyeletted flange 32 for attachment to the swingable landing wheel bracket of the amphibian.

Piston 21 is provided with an axial bore 33 in which is slidable a closely fitting plunger 34, whose travel is limited by suitable abutments 35 and 36. Fixed in coaxial relation to plunger 34 and extending in opposite directions are pins 37 and 38 provided with heads 39 and 40, respectively. Spring seat 41 and 42 are slidable on pins 37 and 38, and interposed between these seats and the plunger are power storing devices, such as compression springs 43 and 44.

Adjacent the ends of bore 33 diametrical slots 45 and 46 are formed in the piston body, these slots adjacent each end being of substantially rectangular cross-section and having parallel walls for slidably guiding pairs of lugs 47, 48 and 49, 50.

Spring seat 41 is provided with diametrically opposite ears to which are pivoted toggle links 51 and 52 which, at their other ends, are pivoted to ears formed on lugs 47 and 48. In the same way spring seat 42 is provided with ears to which are pivoted toggle links 53 and 54 which, at their other ends are pivoted to ears formed at the rear of lugs 49 and 50. Slots 45 and 46 are suitably flared in the direction of bore 33 to permit pivotal movement of the toggle links relative to their respective lugs.

In using the present invention, a wheel axle is preferably hingedly attached at the bottom of that portion of the piston extending below the main cylinder of the strut, which piston telescopes upward into the cylinder by means of fluid forced into the strut cylinder through the hole near the bottom of the cylinder.

Preferably, bore 33 will extend from the top of piston 21 into boss 25 to form a recess 55 in the latter and lugs 35 and 36 will be screw attached at suitable points on the walls of the bore. In recess 55 a clearance is provided for head 40 of pin 38, while a clearance for head 39 of pin 37 is provided in the upper end of the bore. A pair of ducts 56 and 57 communicate recess 55 with the interior of cylinder 10 below the main piston body.

When pressure fluid is absent from both ends of cylinder 10 plunger 34 occupies a position midway between lugs 35 and 36. In Figure 2, it has been assumed that pressure fluid is being introduced into the upper end of cylinder 10 through inlet 15. The pressure fluid while tending to move piston 21 downwardly in cylinder 10 at the same time acts on plunger 34 to move the latter downwardly relative to the piston itself. This relative movement of the plunger is tended to be transmitted to lugs 49 and 50 through spring 44, seat 42 and links 53, 54. Inasmuch as lugs 49 and 50 are in contact with the continuous interior wall of the cylinder their projection beyond the piston periphery is prevented and spring 44 is merely compressed. As soon, however, as slot 46 comes into register with recess 19 lugs 49 and 50 will be projected into the recess and will thus lock the piston against upward movement in the cylinder. When, however, it is desired to move the piston upwardly in the cylinder and pressure fluid is accordingly introduced through inlet 20, the fluid passes through ducts 56 and 57, and moves plunger 34 upwardly relative to piston 21, whereupon head 40 of pin 38 abutting the underside of seat 42 moves the latter upwardly and through the intermediary of links 53 and 43 retracts lugs 49 and 50. The described coaction of head 40 and seat 42 is illustrated in Figure 2 by the coacting relation of head 39 and seat 41. It will be understood that simultaneously with the retraction of lugs 49 and 50 from recess 19 spring 43 is compressed so as to project lugs 47 and 48 into recess 14 when the piston reaches the top of the cylinder.

From this description it is obvious that means actuated in dependence upon the introduction of pressure fluid into the cylinder have been provided for locking the piston at its limits of travel, and that these same means are automatically actuated to unlock the piston upon the introduction of pressure fluid to move it to its other limit position.

When, for example, lugs 49 and 50 have been projected into recess 19 the inner ends of links 53 and 54 may be permitted to move slightly below the horizontal or below the dead center line, thus effectively locking the lugs in engaging relation with the recess. In any event there is no direct retractive effort exerted against the lugs when landing impact is transmitted to the piston, so that even upon complete failure of the operating fluid above the piston, collapse of the telescoping members will be prevented. Landing impacts are transmitted to the piston through damping spring 31, as will be understood.

I claim:

1. In combination, a cylinder, a piston therein, said cylinder having openings at its opposite ends to admit fluid under pressure, a substantially radial slot in said piston, a lug slidable in said slot and projectible beyond the piston periphery, said cylinder having a recess adapted to receive the lug, a power storing device energized upon admission of pressure fluid to one end of the cylinder, means to transmit power from said device to the lug to move the latter into the recess when in register therewith, and means operable to disengage the lug from the recess upon admission of pressure fluid to the other end of the cylinder.

2. In combination, a cylinder, a piston reciprocable in said cylinder, said cylinder having openings at its opposite ends to admit fluid under pressure, said piston having a substantially axial bore therein, a plunger in said bore, a substantially radial slot in said piston adjacent an end of said bore, a lug slidable in said slot and projectible beyond the piston periphery, said cylinder having a recess adapted to receive said lug when the latter is in register therewith, and means for projecting said lug in dependence upon movement of the plunger relative to the piston due to the introduction of pressure fluid into one end of the cylinder and for retracting said lug upon introduction of pressure fluid into the other end of the cylinder.

3. In combination, a cylinder, a piston reciprocable in said cylinder, said cylinder having openings at its opposite ends to admit fluid under pressure, said piston having a substantially axial bore therein, a plunger in said bore, a substantially radial slot in said piston adjacent an end of said bore, a lug slidable in said slot and projectible beyond the piston periphery, said cylinder having a recess adapted to receive said lug when the latter is in register therewith, and means for projecting said lug in dependence upon movement of the plunger relative to the piston due to the introduction of pressure fluid into one end of the cylinder and for retracting said lug upon introduction of pressure fluid into the other end of the cylinder.

4. In combination, a cylinder, a piston reciprocable in said cylinder, said cylinder having openings at its opposite ends to admit fluid under pressure, said piston having a substantially axial bore therein, a plunger in said bore, a substantially radial slot in said piston adjacent an end of said bore, a lug slidable in said slot and projectible beyond the piston periphery, said cylinder having a recess adapted to receive said lug when the latter is in register therewith, a spring compressed upon movement of the plunger relative to the piston due to the introduction of pressure fluid into one end of the cylinder, and means actuated upon expansion of the spring to project the lug into the recess when the two come into register and for retracting the lug upon introduction of pressure fluid into the other end of the cylinder.

5. In combination, a cylinder, a piston reciprocable in said cylinder, said cylinder having openings at its opposite ends to admit fluid under pressure, said piston having a substantially axial bore therein, a plunger in said bore, a substantially radial slot in said piston adjacent an end of said bore, a lug slidable in said slot and projectible beyond the piston periphery, said cylinder having a recess adapted to receive said lug when the latter is in register therewith, a spring compressed upon movement of the plunger relative to the piston due to the introduction of pressure fluid into one end of the cylinder, and a toggle link actuated upon expansion of the spring to project the lug into the recess when the two come into register and for retracting the lug upon introduction of pressure fluid into the other end of the cylinder.

6. In combination, a cylinder, a piston reciprocable in said cylinder, said cylinder having openings at its opposite ends to admit fluid under pressure, said piston having a substantially axial bore therein, a plunger in said bore, a substantially radial slot in said piston adjacent an end of said bore, a lug slidable in said slot and projectible beyond the piston periphery, said cylinder having a recess adapted to receive said lug when the latter is in register therewith, a spring compressed upon movement of the plunger relative to the piston due to the introduction of pressure fluid into one end of the cylinder, a toggle link actuated upon expansion of the spring to project the lug into the recess when the two come into register, and means connected with the plunger for retracting the lug upon introduction of pressure fluid into the other end of the cylinder.

7. In combination, a cylinder, a piston reciprocable in said cylinder, said cylinder having openings at its opposite ends to admit fluid under pressure, said piston having a substantially axial bore therein, a plunger in said bore, a diametrical slot in said piston adjacent an end of said bore, a lug slidable in each end of said slot and projectible beyond the piston periphery, said cylinder having recesses adapted to receive said lugs when the latter are in register therewith, a pin fixed to and projecting longitudinally of said plunger in the direction of said slot and having a head at its free end, a spring seat slidable on said pin, a compression spring interposed between the plunger and seat, and toggle links connecting the seat and lugs.

8. In combination, a cylinder, a piston reciprocable in said cylinder, said cylinder having openings at its opposite ends to admit fluid under pressure, said piston having a substantially axial bore therein, a plunger in said bore, a diametrical slot in said piston adjacent each end of said bore, a pair of lugs slidable in each of said bores and projectible oppositely beyond the piston periphery, said cylinder having recesses at one end adapted to receive one pair of said lugs and recesses at the other end adapted to receive the other pair of said lugs, a headed pin projecting longitudinally from each end of said plunger, a spring seat slidable on each of said pins, a compression spring interposed between each of said seats and the plunger, toggle links connecting one of said seats and one of said pairs of lugs, and toggle links connecting the other of said seats and the other of said pairs of lugs.

Signed at Stratford, Connecticut, in the county of Fairfield and State of Connecticut, this 4th day of March, A. D. 1930.

BORIS BOGOSLOWSKY.